April 6, 1965     F. J. SCHNEIDER     3,176,779
FIELD MARKER FOR AGRICULTURAL IMPLEMENTS
Filed Feb. 26, 1964
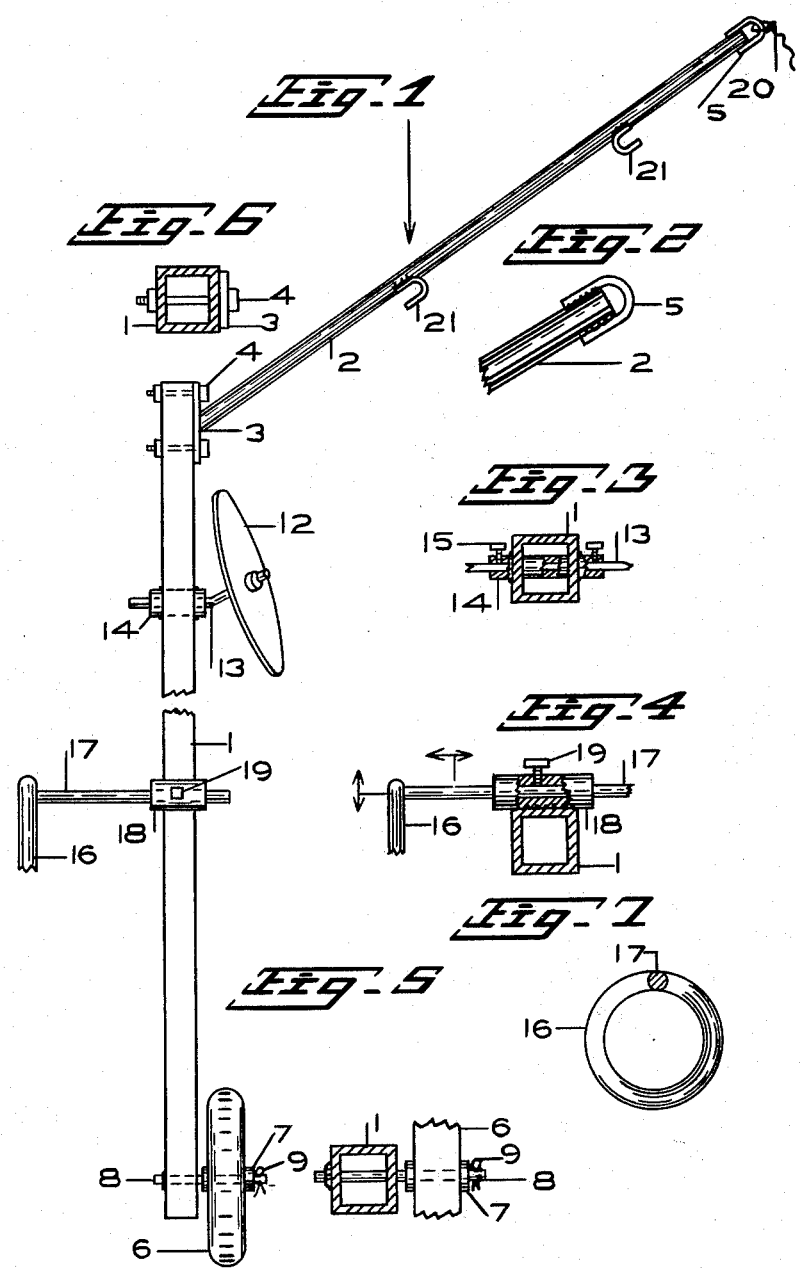

United States Patent Office 3,176,779
Patented Apr. 6, 1965

3,176,779
FIELD MARKER FOR AGRICULTURAL
IMPLEMENTS
Frederick J. Schneider, Eston, Saskatchewan, Canada
(1218 Colony St., Saskatoon, Saskatchewan, Canada)
Filed Feb. 26, 1964, Ser. No. 347,438
3 Claims. (Cl. 172—126)

This invention relates to ground markers, having particular reference to a field marker for use with agricultural implements.

In the art to which the invention relates it is desirable to have a marker attachable for travel in following relation to the implement and offset to leave a mark indented in the soil or stubble as a guide on the subsequent round of the implement.

The present invention provides a weighted wheel marker mounted rotatable rearwardly on a frame on which is forwardly mounted a tow bar attachable to the implement, the marker being held in parallel relation to the travel of the implement by a disc wheel inclined in relation to the frame in opposing directional relation to the frame in opposing directional relation to the draft pull of the tow bar, and including a stabilizer to allow the marker to tip the correct amount for balancing and leveling the tow bar. This ensures an even direction guide line marked in the field in parallel relation to the travel of the implement.

Other features and advantages of the invention will become apparent by reference to the accompanying description taken in conjunction with the drawings.

In the drawings, wherein is illustrated a preferred embodiment of the invention, FIG. 1 is a top plan view of a field marker for implements in accordance with my invention, shown broken away in parts.

FIG. 2 is an enlarged top view of the forward end portion of the tow bar, broken away and in part sectioned.

FIG. 3 is an enlarged side view of the mounting on the tubular frame bar for the disc wheel shaft, shown in parts sectioned and with the shaft broken away.

FIG. 4 is an enlarged side view of the mounting on the tubular frame bar of the stabilizer rod, shown with the rod and stabilizer broken away, and the sleeve mounting the rod partly in section.

FIG. 5 is an enlarged side view of the mounting for the marker wheel axle, shown with the axle broken away and the mounting sleeve partly in section.

FIG. 6 is an enlarged side view of the plate and an attaching bolt for mounting the tow bar on the tubular frame bar.

FIG. 7 is a side view of the stabilizer wheel, shown with its mounting rod in section.

Having reference to the drawings, a tubular frame bar 1, preferably square in cross section as in the present showing, has forwardly attached thereto a tow bar 2 that has its attaching end integrally fixed to a plate 3 secured on the forward end of the frame bar by bolts 4, with the tow bar extending inclined in relation to the frame bar and attachable to an implement, in relation to which the marker is to travel, by a clevis 5 fixed to the tow bar, the marker traveling with the frame bar 1 moving parallel with the direction of travel of the implement.

On the rear end portion of the frame bar 1 a marker wheel 6 with hub 7 is mounted free to turn on an axle 8 that is mounted in a complementary opening through the frame bar 1 and welded thereto, the wheel being retained on the axle 8 by a pin 9 mounted transversely in the axle. The wheel would include a hollow rubber tire filled with weighting material, such as water or iron.

Forwardly on the frame bar 1 is mounted a draft guide disc 12 rotatable on a bent axle 13 that is mounted in a sleeve 14 (FIG. 3) that is fixed, as by welding, in a complementary opening through the frame bar 1, the axle being held in the sleeve by set screws 15.

There is further included a tubular stabilizer ring 16 fixed, as by welding on a rod 17 that is mounted in a sleeve 18 (FIG. 4) fixed, as by welding, transversely on top of the frame bar 1. The rod 17 is free to turn in the sleeve and may be held in a fixed position by a set screw 19.

For towing the marker a rope 20 is attached to the clevis 5 on the forward end of the tow bar. This rope attaches the marker to the implement to pull the marker, and is of a length permitting adjustment of the distance relative to the implement at which the marker is to be drawn by lengthening or shortening the rope connection. The bar 1 has oppositely turned hooks 21 fixed thereto spaced apart and on which the tow rope may be coiled when not in use.

In the use of the device, in attaching the marker to the implement the stabilizer 16 is set in relation to the mounting wheel 6 to allow the marker to tip the correct amount for turning, or to tip over on the turn to automatically reverse directions and to follow on the opposite side of the implement.

The tow rope is attached to the implement, adjusted as to the length required, and the disc 12 is adjusted to the desired angle by adjustment of the bent shank 13 in the sleeve 14, where it is secured by the set screw 15.

The added weight in the tire of the wheel 6 is required to press down grain, stubble, etc., or the bare soil, to leave a smooth mark at a given distance as a guide to follow on the next round of the implement. The mounting can be adjusted for operation on either side of the implement.

What I claim is:

1. A field marker for an agricultural implement having a frame consisting of a single frame bar and a tow bar fixed to the front end portion of the frame bar inclined laterally in relation thereto, a marker wheel with a hollow rubber tire, means mounting the marker wheel rotatable on the rear end portion of the frame bar in supporting relation thereto, a draft guide comprising a flat disc and a bent axle on which the disc is rotatable, means mounting the disc axle on the frame bar adjustable axially thereon, the bent portion of the axle inclining from the mounting means by which the disc may be set in opposing directional relation to the draft pull on the tow bar, and a stabilizer comprising a tubular ring and a rod fixed at one end to the side of the ring extending laterally and means mounting the other end of the rod on the frame bar turnable axially and securable to the frame bar with the ring extending above and below the frame bar.

2. In a field marker for an agricultural implement, said marker having a frame formed of a single frame bar having a tow bar fixed to the forward end thereof extending inclined laterally and a marker wheel on the rear end of the frame bar, a stabilizer for the frame comprising a tubular ring, a rod fixed to the side of the ring extending laterally therefrom, and means mounting the rod on the frame bar adjustable to be turned axially and securable in fixed relation to the frame bar mounting the ring extending above and below the frame bar.

3. In a field marker for an agricultural implement, said marker having a frame formed of a single frame bar having a tow bar fixed to the front end thereof inclined laterally and a marker wheel mounted on the rear end of the frame bar, a disc wheel mounted on the frame bar opposing the side draft pull of the tow bar, in which said disc wheel comprises a flat disc mounted on an axle, said axle having one portion thereof transversely mounted on the frame bar to be turnable axially and securable thereto, and the other end portion thereof bent at an angle in relation to the frame bar mounting for the axle, and a stabilizer comprising a tubular ring and a rod fixed at one end to the side of the ring extending laterally, and means mounting the other end of the rod on the frame bar turnable axially and securable in fixed relation to the frame bar.

References Cited by the Examiner
UNITED STATES PATENTS

| | | | |
|---|---|---|---|
| 1,211,811 | 1/17 | Bailey | 172—611 |
| 1,363,412 | 12/20 | Hanson | 172—126 |
| 2,237,207 | 4/41 | Zimmerman | 152—330 |
| 2,511,521 | 6/50 | Watmough | 172—186 |
| 2,634,667 | 4/53 | Woolwine | 172—186 X |
| 2,725,814 | 12/55 | Watmough | 172—126 |

FOREIGN PATENTS

| | | |
|---|---|---|
| 144,225 | 11/51 | Australia. |
| 90,458 | 2/61 | Denmark. |
| 588,200 | 1/25 | France. |

ABRAHAM G. STONE, *Primary Examiner.*

T. GRAHAM CRAVER, *Examiner.*